May 29, 1956     W. D. ORSER     2,747,466
OPTICAL SCANNING OBJECTIVE LENS SYSTEM FOR INSPECTION DEVICES
Filed March 31, 1954

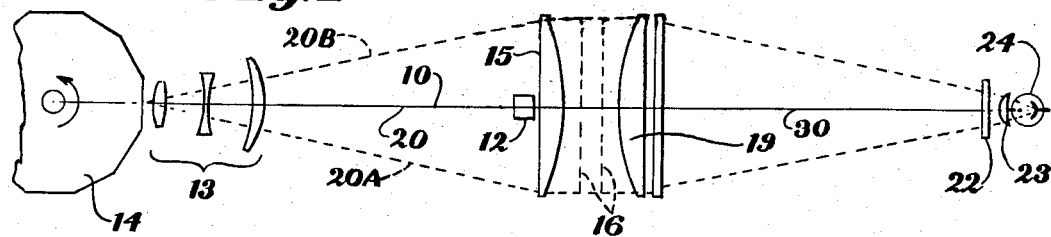

*Fig. 1*

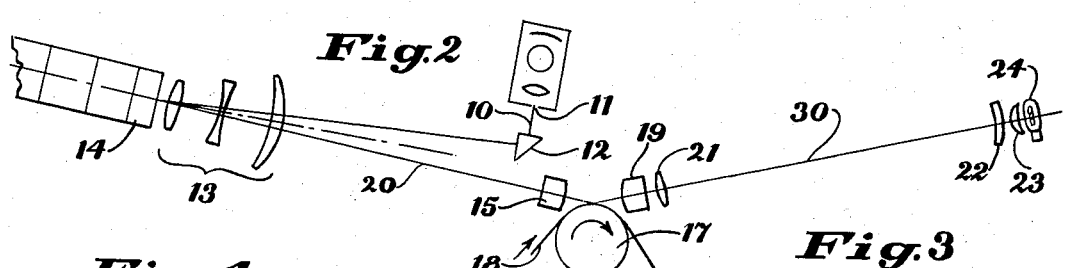

| LENS | N | V | RADII | THICKNESSES |
|---|---|---|---|---|
| 1 | 1.6203 | 60.3 | $R_1 = +37.94$ mm. | $t_1 = 1.95$ mm. |
|   |        |      | $R_2 = -78.48$ | $S_1 = 11.85$ |
| 2 | 1.7200 | 29.3 | $R_3 = -20.65$ | $t_2 = 1.23$ |
|   |        |      | $R_4 = +38.70$ | $S_2 = 10.59$ |
| 3 | 1.6968 | 56.2 | $R_5 = -106.1$ | $t_3 = 2.82$ |
|   |        |      | $R_6 = -21.15$ |   |

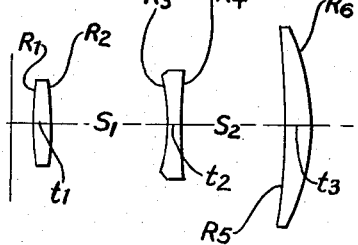

| LENS | N | V | RADII | THICKNESSES |
|---|---|---|---|---|
| 1 | 1.6203 | 60.3 | $R_1 = +27.07$ mm. | $t_1 = 2.01$ mm. |
|   |        |      | $R_2 = \infty$ | $S_1 = 9.74$ |
| 2 | 1.7200 | 29.3 | $R_3 = -41.22$ | $t_2 = 1.30$ |
|   |        |      | $R_4 = +29.97$ | $S_2 = 13.70$ |
| 3 | 1.6968 | 56.2 | $R_5 = -495.3$ | $t_3 = 1.65$ |
|   |        |      | $R_a = -103.9$ | $S_3 = 0.41$ |
| 4 | 1.6968 | 56.2 | $R_b = -109.3$ | $t_4 = 2.62$ |
|   |        |      | $R_6 = -32.31$ |   |

*Fig. 5*

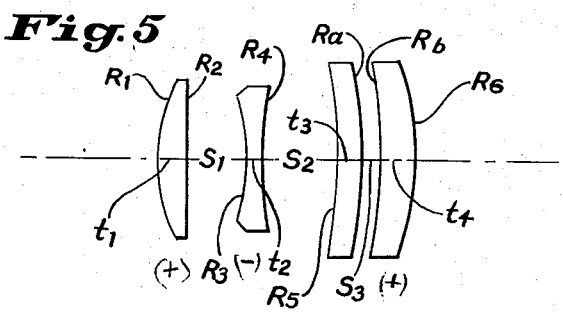

*William Donald Orser*
INVENTOR.

BY *Daniel L. Mayne*
*Harold F. Bennett*
ATTORNEY & AGENT

United States Patent Office 2,747,466
Patented May 29, 1956

2,747,466

OPTICAL SCANNING OBJECTIVE LENS SYSTEM FOR INSPECTION DEVICES

William Donald Orser, Rochester, N. Y., assignor to Eastman Kodak Company, Rochester, N. Y., a corporation of New Jersey Application March 31, 1954, Serial No. 420,056

5 Claims. (Cl. 88—57)

This invention relates to the optical scanning of surfaces and particularly to the inspection of sheet material to detect imperfections affecting the light transmitting or reflecting properties thereof. It is also useful in other processes using scanning such as the electrical transmission of pictures, photoelectrically controlled engraving, the measurement of areas of openings or pigmented areas and the measurement of the area under a mathematical curve, depending upon the manner in which the output signal of the scanning device is interpreted.

The object of the invention is to provide an efficient optical system for the scanning of sheet material and particularly to provide a system which gives a sharply defined flying spot.

It is known to scan surfaces or sheet materials with a flying spot of light, to pick up the reflected or transmitted light whichever is of interest, or both if need be, and to concentrate it onto a photosensitive device which gives out a signal corresponding to variations in the light-modifying properties of the material. The manner in which this signal is used is not essential to the present invention, but a device for using transients in the output signal for the detection of flaws in photographic film and for cutting the film to remove the flaws is described in copending applications, Serial No. 421,876, filed April 8, 1954, by Howard J. Emerson; Serial No. 421,875, filed April 8, 1954, by John H. Juengst et al., and Serial No. 407,969, filed February 3, 1954, by Gordon S. Rugg.

According to the present invention an optical scanning system is made up comprising the following parts (1) a point source of light such as an illuminated pinhole, (2) a highly corrected collimating lens comprising a negative component between two positive components, (3) a rotating mirror-drum for reflecting the collimated light back through the collimator lens whereby it is focused to form the flying spot, (4) a field lens for rendering the principal ray parallel to itself in its successive positions as it sweeps across the scanning area, (5) a similar field lens for receiving the modified light which leaves the scanning area and converging it toward the photo-receptor position and (6) a condensing lens having cylindrical power for concentrating the light into the photo-receptor position. Normally, means are provided for supporting the material being tested in position at the scanning area and a photo-receptor is provided at the photo-receptor position with an associated circuit for interpreting the output signal for the purposes desired.

Due to the fact that the effective aperture stop is in front of the objective, no ordinary photographic lens corrected for use with an internal stop was found to be sufficiently well corrected for coma and astigmatism.

According to a special feature of the invention a highly corrected collimating lens for use in scanning and like systems is made up consisting of a negative component axially aligned between two positive components and including at most four lens elements, in which the radii of curvature $R$ of the outer surfaces of all the components, the refractive indices $N$ of the strongest element in the respective components and the separations $s$ between components, each numbered by subscripts from front to rear, are within the ranges specified as follows:

$0.25\ F < +R_1 < 0.40\ F$
$0.75\ F < -R_2$
$0.18\ F < -R_3 < 0.44\ F$
$0.26\ F < +R_4 < 0.41\ F$
$0.90\ F < -R_5 < 10\ F$
$0.18\ F < -R_6 < 0.35\ F$
$1.60 < N_1 < 1.64$
$1.70 < N_2 < 1.74$
$1.68 < N_3 < 1.72$
$0.08\ F < s_1 < 0.14\ F$
$0.09\ F < s_2 < 0.18\ F$ where $F$ is the focal length of the objective as a whole and where the $+$ and $-$ radii indicate surface convex and concave, respectively, to the front of the objective, and in which the thickness of each lens element is less than $0.05\ F$. By "scanning and like systems" is meant systems in which the objective is used with an effective aperture stop in front thereof, that is on the side facing the longer conjugate. Another example is a galvanometer deflection system. By "component" is meant either a single unitary lens element made of one piece of glass or two closely associated lens elements either cemented together or separated by a small airspace, that is an airspace smaller than $0.05\ F$ at the axis.

One form of collimating objective which is advantageous because of its comparative simplicity consists of three simple lens elements. In this form of the objective I prefer to have the front component biconvex, the center component biconcave and the rear component meniscus and concave toward the front, the respective powers being in the following ranges:

$2\ P < +P_1 < 3\ P$
$4.6\ P < -P_2 < 6\ P$
$2.1\ P < +P_3 < 3.2\ P$

Also $s_1$ is conveniently between $0.08\ F$ and $0.14\ F$ and $s_2$ between $0.5 s_1$ and $1.4 s_1$. I have found that good correction of coma is obtained in this form of the objective by shaping the biconcave component so that $$(R_3 R_4 - s_2/2 s_1)$$

is numerically less than $0.1$ and making the biconcave component of a glass having a refractive index between $0.04$ and $0.08$ higher than the average of the other two components. Preferably all the refractive indices are between $1.55$ and $1.90$.

It may be noted that $(R_3 R_4 - s_2/2 s_1)$ has been computed for a great many known spaced triplets and in every case in the specified range of spacing it is between $0.16$ and $0.60$.

In another form of collimating lens, I have discovered that a marked improvement in oblique spherical aberration or rim ray aberration is achieved by introducing a small airspace of slight positive power into the rear component and shaping the biconcave component more nearly like the average photographic triplet. The ratio $s_2/s_1$ is conveniently between $1.0$ and $2.0$ in this form of the invention, $R_3/R_4$ between $1.1$ and $1.7$, and the powers $P_1$, $P_2$, $P_3$ of the respective components are as follows:

$1.9\ F < +P_1 < 2.9\ P$
$3.5\ P < -P_2 < 5\ P$
$1.5 < P + P_3 < 2.6\ P$ where $P$ is the power of the objective, while the front airspace is between $0.07\ F$ and $0.13\ F$ and the rear airspace within the rear component between zero and $0.05\ F$. The power of the airspace within the rear component is preferably between zero and $+0.1\ P$.

In the accompanying drawings:

Fig. 1 is a diagrammatic modified plan view of a scanning device according to the invention.

Fig. 2 is a side view thereof.

Fig. 3 is a diagrammatic axial section of an objective according to the invention for use in the scanning system.

Fig. 4 is a table of constructional data for one embodiment of Fig. 3.

Fig. 5 is a similar section of a modified form of objective according to the invention.

Fig. 6 is a table of data for one embodiment of Fig. 5.

Figs. 1 and 2 generally show the scanned area at the center, the illuminating or scanning system at the left, and the pick-up or receptor system at the right. Fig. 2 is a diagrammatic elevation and Fig. 1 substantially a diagrammatic plan view. However, Fig. 1 does not show the system viewed exactly vertically downward, but rather the left and right halves are viewed normally to the plane in which the scanning ray sweeps and to the axis of the receptor system respectively.

In Figs. 1 and 2 a ray of light 10 from an illuminated pinhole 11 (not shown in Fig. 1) is directed downward and deflected by a prism 12 into a nearly horizontal direction where it is received into the rear of the objective 13, making a small angle of about 1° with the axis of the objective. This ray represents a diverging cone of rays which is collimated by the objective to strike the mirror drum 14 as a substantially parallel bundle. The mirror drum is perpendicular to the lens axis so that the rays are reflected back through the lens below the axis to a focus at about the same optical distance as the pinhole. The invention is not limited to arrangements in which the pinhole and its image are equidistant, but that is usually a convenient arrangement.

The representative ray 10 emerges from the rear of the objective as ray 20 in a plane inclined at the same angle below the lens axis as the original ray 10 is above the axis and sweeps across this plane from the position 20A to the position 20B as the mirror drum rotates. The mirror drum may have any convenient number of faces from about ten to perhaps a hundred. Drums have been made with 24 and 40 faces and these have been satisfactory for the purposes intended.

The reflected ray 20 reaches its focus at the center of the scanning area roughly indicated by the parallel dashed lines 16 in Fig. 1 and lying along the top of the cylindrical roller 17 in Fig. 2 over which the film 18 is drawn during scanning. Before reaching the scanning area, however, it passes through the field lens 15 which is conveniently a plano-convex lens of spherical power but cut into a long narrow rectangular cross section. A fine-lined fresnel type lens has been tried in this position but it causes too many spurious signals. Also an aspherical lens has been tried but has not been found worth the extra cost. The field lens renders the principal ray 20A, 20, 20B parallel to itself in its successive positions.

It has been found in practice that a slight adjustment of the field lens 15 upward or downward is very helpful in getting the flying spot to track in a straight line rather than a curved line along the cylinder, and this is very important in eliminating cyclical variations in sensitivity and signal strength. It is also important that the combination of lenses 13 and 15 have a flat field so that the flying spot will be in uniformly sharp focus as it traverses the length of the scanning area.

In Fig. 2 ray 20 is specularly reflected as ray 30 and strikes the second field lens 19 which is conveniently a twin of lens 15 but may have a shorter focal length if space is a consideration. A positive cylindrical lens 21 is provided to neutralize the astigmatism arising from the reflection at the cylindrical surface of the film. This lens is omitted in other forms of the invention in which reflection occurs at a flat surface or in which the receptor system is positioned to receive light transmitted by the sheet material being scanned.

The field lens 19 converges the light toward the photocell position where it is further concentrated by lenses 22 and 23 with cylindrical and spherical power respectively onto the sensitive area of the photoelectric tube 24.

Figs. 3 and 5 show in diagrammatic axial section two examples of objectives according to the invention. Each objective consists of a biconcave element between two positive components. The rear component has the largest diameter in each case because the effective aperture stop is in front of the lens a short distance beyond the facet of the mirror drum. This unusual position of the stop makes it impossible to correct the coma by the usual arrangement of curvatures and spacings in photographic triplets. In Fig. 3 each component is a simple lens element and the coma is corrected by the very unusual shape of the biconcave component, the front surface thereof being more strongly curved relative to the rear surface than is the case in ordinary photographic lenses. In Fig. 5 the rear component is divided into two elements by a small airspace of positive power. This not only corrects coma but improves the oblique spherical aberration as well.

Figs. 4 and 6 give constructional data for one example each according to Figs. 3 and 5, respectively. These tables of data are repeated below:

*Example 1, Figs. 3 and 4*
[EF=100 mm.]

| Lens | N | V | Radii, mm. | Thicknesses, mm. |
|------|-----|------|-----------------|-------------|
| 1 | 1.6203 | 60.3 | $R_1=+37.94$ | $t_1=1.95$ |
|   |        |      | $R_2=-78.48$ | $s_1=11.85$ |
| 2 | 1.7200 | 29.3 | $R_3=-20.65$ | $t_2=1.23$ |
|   |        |      | $R_4=+38.70$ | $s_2=10.59$ |
| 3 | 1.6968 | 56.2 | $R_5=-106.1$ | $t_3=2.82$ |
|   |        |      | $R_6=-21.15$ |            |

*Example 2, Figs. 5 and 6*
[EF=100 mm.]

| Lens | N | V | Radii, mm. | Thicknesses, mm. |
|------|-----|------|-----------------|-------------|
| 1 | 1.6203 | 60.3 | $R_1=+27.07$ | $t_1=2.01$ |
|   |        |      | $R_2=\infty$ | $s_1=9.74$ |
| 2 | 1.7200 | 29.3 | $R_3=-41.22$ | $t_2=1.30$ |
|   |        |      | $R_4=+29.97$ | $s_2=13.70$ |
| 3 | 1.6968 | 56.2 | $R_5=-495.3$ | $t_3=1.65$ |
|   |        |      | $R_a=-103.9$ | $s_3=0.41$ |
| 4 | 1.6968 | 56.2 | $R_b=-109.3$ | $t_4=2.62$ |
|   |        |      | $R_6=-32.31$ |            |

In these tables, the lens elements are numbered from front to rear in the first column, the corresponding refractive indices N for the D line of the spectrum and the conventional dispersive index V are given in the second and third columns. In the fourth column the radii of curvatures R are given. These are numbered by subscripts from 1 to 6 for the front and rear surfaces of the respective components, and the two additional surfaces in Example 2 which form the small airspace in the rear component according to one feature of the invention are designated $R_a$ and $R_b$. The thicknesses $t$ of the lens elements and the spaces $s$ between elements, each numbered by subscripts, are given in the last column.

The powers of the respective components are approximately $+2.4\,P$, $-5.3\,P$ and $+2.6\,P$ in Example 1 and $+2.3\,P$, $-4.2\,P$ and $+2.0\,P$ in Example 2, where P is the power, that is the reciprocal of the focal length, of the objective. The power of the airspace in Example 2 is $(0.6-0.64)$ P or substantially $+0.03$ P.

The second space $s_2$ is equal to $0.9s_1$ in Example 1 and $1.4s_1$ in Example 2. The ratio of the radii $R_3/R_4$ is 0.53 in Example 1 and 1.4 in Example 2. This ratio differs from half of $s_2/s_1$, or 0.45, by less than $\pm 0.1$ in Example 1, all in accordance with special features of these respective forms of the invention. Other features of the invention are directly apparent in the tables of data.

I claim:

1. An objective for use in scanning systems and corrected for use with an aperture stop in front of the objective, consisting of a negative component axially aligned and spaced between two positive components and including at most four lens elements, in which the radii of curvature R of the outer surfaces of the components, the refractive indices N of the strongest element in the respective components, and the separations $s$ between components, each numbered by subscripts from front to rear, are within the following specified ranges:

$$0.25\ F < +R_1 < 0.40\ F$$
$$0.75\ F < -R_2 \leq \infty$$
$$0.18\ F < -R_3 < 0.44\ F$$
$$0.26\ F < +R_4 < 0.41\ F$$
$$0.90\ F < -R_5 < 10\ F$$
$$0.18\ F < -R_6 < 0.35\ F$$
$$1.60 < N_1 < 1.64$$
$$1.70 < N_2 < 1.74$$
$$1.68 < N_3 < 1.72$$
$$0.08\ F < s_1 < 0.14\ F$$
$$0.09\ F < s_2 < 0.18\ F$$

where F is the focal length of the objective as a whole and where the $+$ and $-$ values of the radii denote surfaces respectively convex and concave toward the front of the objective, and in which the thickness of each lens element is less than 0.05 F.

2. An objective for use in scanning systems and corrected for use with an aperture stop in front of the objective, consisting of a biconcave lens element airspaced and axially aligned between two positive lens elements of which the front one is biconvex and the rear one concave toward the front, in which the powers P of the individual elements and the spaces $s$ between elements each numbered by subscripts from front to rear are within the following specified ranges:

$$2\ P < +P_1 < 3\ P$$
$$4.6\ P < -P_2 < 6\ P$$
$$2.1\ P < +P_3 < 3.2\ P$$
$$0.08\ F < s_1 < 0.14\ F$$
$$0.04\ F < s_2 < 0.20\ F$$

where P is the power and F the focal length of the objective, in which the biconcave component is made of a glass having a refractive index between 0.04 and 0.08 higher than the average of the indices of the two positive elements, and is so shaped that the ratio $R_3/R_4$ of the radii of curvature of its front and rear surfaces differs from $s_2/2s_1$ by less than $\pm 0.1$.

3. An objective for use in scanning systems and corrected for use with an aperture stop in front of the objective, consisting of a biconcave lens element airspaced and axially aligned between a simple convex lens element in front and a component consisting of a pair of airspaced meniscus positive elements in the rear, all three positive elements being turned with their weaker surfaces toward the biconcave lens, in which the powers P of the three components and the axial lengths of the spaces $s$ between elements each numbered by subscripts from front to rear as well as the power $P_a$ of the airspace between the two elements of the rear component are within the following specified ranges:

$$1.9\ P < +P_1 < 2.9\ P$$
$$3.5\ P < -P_2 < 5\ P$$
$$1.5\ P < +P_3 < 2.6\ P$$
$$0.07\ F < s_1 < 0.13\ F$$
$$0.07\ F < s_2 < 0.26\ F$$
$$0.00 < s_3 < 0.05\ F.$$
$$0.00 < +P_a < 0.10$$

where P is the power and F the focal length of the objective, and in which the ratio of the radius of curvature of the front surface of the biconcave element to that of the rear surface thereof is numerically between 1.1 and 1.7.

4. An optical objective corrected for use with an aperture stop in front thereof and consisting of three airspaced elements, in which the refractive indices N and dispersive indices V of the lens elements, the radii of curvature R of the optical surfaces, the thicknesses $t$ of the lens elements and the spaces $s$ between lens elements are substantially as listed in order from front to rear under the respective headings in the following table:

| N | V | R | $t$ | $s$ |
|---|---|---|---|---|
| 1.62 | 60 | $R_1 = +0.38\ F$ | $t_1 = 0.02\ F$ | |
| | | $R_2 = -0.78\ F$ | | $s_1 = 0.12\ F$ |
| 1.72 | 29 | $R_3 = -0.21\ F$ | $t_2 = 0.01\ F$ | |
| | | $R_4 = +0.38\ F$ | | $s_2 = 0.11\ F$ |
| 1.70 | 56 | $R_5 = -1.06\ F$ | $t_3 = 0.03\ F$ | |
| | | $R_6 = -0.21\ F$ | | | where F is the focal length of the objective and the $+$ and $-$ values of the radii R indicate surfaces respectively convex and concave to the front.

5. An optical objective corrected for use with an aperture stop in front thereof and consisting of four airspaced elements, in which the refractive indices N and dispersive indices V of the lens elements, the radii of curvature R of the optical surfaces, the thicknesses $t$ of the lens elements and the spaces $s$ between lens elements are substantially as listed in order from front to rear under the respective headings in the following table:

| N | V | R | $t$ | $s$ |
|---|---|---|---|---|
| 1.62 | 60 | $R_1 = +0.27\ F$ | $t_1 = 0.02\ F$ | |
| | | $R_2 = \infty$ | | $s_1 = 0.10\ F$ |
| 1.72 | 29 | $R_3 = -0.41\ F$ | $t_2 = 0.01\ F$ | |
| | | $R_4 = +0.30\ F$ | | $s_2 = 0.14\ F$ |
| 1.70 | 56 | $R_5 = -5.0\ F$ | $t_3 = 0.02\ F$ | |
| | | $R_a = -1.0\ F$ | | $s_3 = 0.01\ F$ |
| 1.70 | 56 | $R_b = -1.1\ F$ | $t_4 = 0.03\ F$ | |
| | | $R_6 = -0.32\ F$ | | | where F is the focal length of the objective and the $+$ and $-$ values of the radii R indicate surfaces respectively convex and concave to the front.

References Cited in the file of this patent

UNITED STATES PATENTS

| | | |
|---|---|---|
| 660,747 | Bausch | Oct. 30, 1900 |
| 1,540,752 | Bielicke | June 9, 1925 |
| 1,739,512 | Lee | Dec. 17, 1929 |
| 2,059,221 | Fessenden | Nov. 3, 1936 |
| 2,059,222 | Fessenden | Nov. 3, 1936 |
| 2,147,452 | Meyer | Feb. 14, 1939 |
| 2,222,937 | Dimmick | Nov. 26, 1940 |
| 2,388,869 | Reiss | Nov. 13, 1945 |
| 2,487,873 | Herzberger et al. | Nov. 15, 1949 |
| 2,582,362 | Taylor | Jan. 15, 1952 |